United States Patent
Liu et al.

(10) Patent No.: US 10,014,021 B1
(45) Date of Patent: Jul. 3, 2018

(54) PERPENDICULAR MAGNETIC RECORDING (PMR) WRITE HEAD WITH PATTERNED LEADING SHIELD

(71) Applicant: Headway Technologies, Inc., Milpitas, CA (US)

(72) Inventors: Ying Liu, San Jose, CA (US); Yuhui Tang, Milpitas, CA (US); Yue Liu, Fremont, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 15/595,338

(22) Filed: May 15, 2017

(51) Int. Cl.
| | |
|---|---|
| G11B 5/31 | (2006.01) |
| G11B 5/596 | (2006.01) |
| G11B 5/11 | (2006.01) |
| G11B 5/127 | (2006.01) |
| G11B 5/10 | (2006.01) |
| G11B 5/39 | (2006.01) |
| G11B 5/55 | (2006.01) |

(52) U.S. Cl.
CPC .......... *G11B 5/59688* (2013.01); *G11B 5/112* (2013.01); *G11B 5/1278* (2013.01); *G11B 5/31* (2013.01); *G11B 5/315* (2013.01); *G11B 5/3163* (2013.01); *G11B 5/10* (2013.01); *G11B 5/127* (2013.01); *G11B 5/3116* (2013.01); *G11B 5/3146* (2013.01); *G11B 5/3961* (2013.01); *G11B 5/5513* (2013.01)

(58) Field of Classification Search
CPC ......... G11B 5/31; G11B 5/1278; G11B 5/315; G11B 5/3163
USPC ................................ 360/119.02, 125.3
See application file for complete search history.

(56) References Cited

U.S. PATENT DOCUMENTS

| | | | |
|---|---|---|---|
| 7,268,974 | B2 | 9/2007 | Lille |
| 7,952,831 | B2 | 5/2011 | Kim et al. |
| 8,111,479 | B2 | 2/2012 | Chen et al. |
| 8,284,516 | B1 | 10/2012 | Tang et al. |
| 8,427,781 | B1 | 4/2013 | Sasaki et al. |
| 8,542,461 | B2 | 9/2013 | Bai et al. |
| 8,582,238 | B1 | 11/2013 | Liu et al. |

(Continued)

OTHER PUBLICATIONS

Effect of 3d, 4d, and 5d transition metal doping on damping in permalloy thin films, by J. O. Rantschler et al., Journal of Applied Physics 101, 033911, Feb. 14, 2007, pp. 1-5.

(Continued)

*Primary Examiner* — Jefferson Evans
(74) *Attorney, Agent, or Firm* — Saile Ackerman LLC; Stephen B. Ackerman

(57) ABSTRACT

A perpendicular magnetic recording writer is disclosed with a leading shield (LS) having an upper layer that extends from an air bearing surface (ABS) to a backside at a first height (a). A LS lower layer has an upper surface that contacts the LS upper layer, a front side at the ABS, and a backside at a second height (b) where b>a. LS lower layer has a notch in the upper surface that is recessed from the ABS and has a first side aligned parallel to the ABS. The notch is aligned below the main pole and has a cross-track width that is from 1× to 11× the track width, and two sidewalls formed equidistant from a center plane wherein each sidewall intersects the first side at a 90 to 170 degree angle. Accordingly, overwrite, bit error rate (BER), and tracks per square inch capability are improved.

35 Claims, 9 Drawing Sheets

(56) References Cited

U.S. PATENT DOCUMENTS

| | | | |
|---|---|---|---|
| 8,724,259 B1* | 5/2014 | Liu | G11B 5/1278 |
| | | | 360/125.15 |
| 8,749,919 B2 | 6/2014 | Sasaki et al. | |
| 8,879,208 B1 | 11/2014 | Liu et al. | |
| 9,082,422 B2* | 7/2015 | Sasaki | G11B 5/3163 |
| 9,082,433 B1 | 7/2015 | Tang et al. | |
| 9,361,912 B1 | 6/2016 | Liu et al. | |
| 9,406,317 B1* | 8/2016 | Tang | G11B 5/3116 |
| 9,466,319 B1 | 10/2016 | Tang et al. | |
| 9,489,969 B1* | 11/2016 | Ikegawa | G11B 5/315 |
| 9,502,053 B1* | 11/2016 | Sasaki | G11B 5/3116 |
| 9,508,364 B1 | 11/2016 | Tang et al. | |
| 9,697,852 B2* | 7/2017 | Xue | G11B 5/17 |
| 9,721,604 B2* | 8/2017 | Tang | G11B 5/3116 |
| 9,767,831 B1* | 9/2017 | Pan | G11B 5/23 |
| 9,824,700 B1* | 11/2017 | Aritomo | G11B 5/1272 |
| 2007/0171575 A1 | 7/2007 | Lim et al. | |
| 2013/0027809 A1 | 1/2013 | Min et al. | |
| 2013/0038966 A1* | 2/2013 | Sasaki | G11B 5/17 |
| | | | 360/123.04 |
| 2013/0283601 A1* | 10/2013 | Sasaki | G11B 5/1278 |
| | | | 29/603.07 |
| 2013/0335847 A1 | 12/2013 | Shiroishi | |
| 2015/0085402 A1* | 3/2015 | Bashir | G11B 5/3116 |
| | | | 360/235.4 |
| 2015/0380016 A1* | 12/2015 | Sasaki | G11B 5/3163 |
| | | | 360/119.02 |
| 2017/0133042 A1* | 5/2017 | Moore | G11B 5/115 |
| 2018/0033458 A1* | 2/2018 | Ho | G11B 5/60 |

OTHER PUBLICATIONS

"Magnetic Damping in Ferromagnetic Thin Films," by Mikihiko Oogane et al., Japanese Journal of Applied Physics, vol. 45, No. 5A, May 2006, pp. 3889-3891.

* cited by examiner

PERPENDICULAR MAGNETIC RECORDING (PMR) WRITE HEAD WITH PATTERNED LEADING SHIELD

RELATED PATENT APPLICATIONS

This application is related to the following: U.S. Pat. No. 9,508,364; and, Ser. No. 15/595,357, filing date May 15, 2017; assigned to a common assignee and herein incorporated by reference in their entirety.

TECHNICAL FIELD

The present disclosure relates to a leading shield structure in a PMR write head wherein a notch is formed in middle section of a side of the leading shield facing the main pole to enhance overwrite (OW) performance, lower the bit error rate (BER), and improve tracks per inch (TPI) capability with minimal tradeoff in bits per inch (BPI) capability or adjacent track interference (ATI) for both conventional and shingle magnetic recording applications.

BACKGROUND

Perpendicular magnetic recording has been developed in part to achieve higher recording density than is realized with longitudinal recording devices. A PMR write head typically has a main pole layer with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop where both involve a shield structure. The trailing loop comprises a trailing shield structure with first and second trailing shields each having a front side at the ABS. The leading loop includes a leading shield with a front side at the ABS and connected to a return path proximate to the ABS. The return path extends to the back gap connection and enables magnetic flux in the leading loop pathway to return from the leading shield through the back gap connection to the main pole layer.

For both conventional (CMR) and shingle (SMR) magnetic recording, continuous improvement in storage area density is required for a PMR writer. A write head that can deliver or pack higher bits per inch (BPI) and higher tracks per inch (TPI) is essential to the area density improvement. A fully wrapped around shield design for a PMR write head is desired where the trailing shield is responsible for improving down track field gradient while side shields and a leading shield enhance the cross track field gradient and TPI as well as improve adjacent track erasure (ATE) also known as ATI.

The key to an optimized PMR writer structure is the capability to control distribution of magnetic flux from the main pole to each shield. Ideally, better control of magnetic flux in the near field or proximate to the main pole is desirable to achieve an enhanced near field gradient and to realize higher area density capability (ADC). Typically, flux distribution is controlled by changing the magnetic saturation (Ms) of materials in the shields, and by modifying geometries (size and shape) of the shields. In today's PMR design, most shield optimization efforts have focused on the side shields and trailing shield, and considerably less emphasis on the leading shield. However, the leading shield plays an important role in preventing side shield saturation and leading shield induced ATI. Moreover, the typical leading shield straight bar shape is associated with an ATI/TPI loss from being too thin and an OW/BPI loss from being too thick. Therefore, an improved leading shield design is necessary in order to achieve better ATI and TPI while maintaining OW and BPI for enhanced CMR and SMR performance.

SUMMARY

One objective of the present disclosure is to provide leading shield design for a PMR writer that enables a means of improving bit error rate (BER), OW, and TPI while substantially maintaining ATI and BPI.

Another objective of the present disclosure is to provide a method of forming the leading shield of the first objective that is readily implemented in a manufacturing environment.

According to a first embodiment, these objectives are achieved with a PMR writer that has an all wrap around (AWA) shield structure wherein a patterned leading shield, side shields, and trailing shield surround a main pole at the ABS, and adjoin a lead gap, side gap, and write gap, respectively. However, the patterned leading shield is not limited to an AWA shield structure in order to deliver improved PMR writer performance as described herein. In one embodiment, the main pole has tapered leading side that extends from the ABS to a back end at a first corner where the tapered leading side intersects with a front end of a main pole leading side formed orthogonal to the ABS. Likewise, the main pole may have a tapered trailing side that extends from the ABS to a second corner where the tapered trailing side intersects with a main pole trailing side formed orthogonal to the ABS.

In one embodiment, the leading shield has a bilayer structure with an upper layer, and a patterned lower layer that comprises a notch. The upper layer has a rectangular shape from a top-down view with a first cross-track width (w) between sides thereof, a front side at the ABS, and a backside at a first height (h1) from the ABS. From a down-track cross-sectional view, the upper layer has a top surface adjoining the lead gap and aligned substantially parallel to the tapered main pole leading side. The top surface extends from the ABS to the first height that is at the backside of the upper layer. The upper layer backside terminates at a top surface of the lower layer.

From a down-track cross-sectional view in the exemplary embodiment, the leading shield (LS) lower layer has a top surface aligned orthogonal to the ABS and extending from the ABS to a backside at a second height (h2) from the ABS where h2 is substantially greater than h1. From an ABS perspective, the LS lower layer has the first cross-track width between two sides wherein each side is coplanar with a side of the LS upper layer. There is a notch recessed a third height (h3) behind the ABS, and with two sidewalls formed on either side of a center plane that bisects the main pole and the leading shield. In some embodiments h1>h3, but in other embodiments h1<h3. The notch extends from the top surface of the LS lower layer for a first down-track distance to a second side that is orthogonal to the center plane and ABS. Moreover, the second side has a second cross-track width (w1) that is preferably within ±20% of the track width at the main pole trailing side. From a top-down view, each sidewall forms an angle θ of 90° to 170° with a first side that is aligned parallel to the ABS such that the notch has cross-track width at the LS lower layer backside that is ≥w1.

From an ABS view, the main pole may have a trapezoidal shape wherein a trailing side has a track width (TW) that is greater than a cross-track width of the leading side. Moreover, each of the side shield layers has a main pole facing side that adjoins a side gap layer and is essentially parallel to the nearest main pole side. A high Ms (19-24 kG) magnetic layer hereafter called the hot seed layer adjoins a top surface of the write gap and is part of the trailing shield structure. In an AWA shield design, a trailing shield layer is formed on a top surface of the hot seed layer, adjoins the sides of the write gap and hot seed layer, and contacts a top surface of the side shield on each side of the main pole. The notch in the patterned leading shield is recessed behind the ABS, and the first side is aligned below and parallel to the main pole leading edge at the ABS.

The patterned LS lower layer serves to release additional main pole flux from the leading side of the main pole thereby boosting overwrite capability when writing a bit on the magnetic medium. Thereafter, a substantial portion of the additional flux returns through the trailing loop to the main pole and enhances trailing shield response. Because of reduced volume in the patterned LS lower layer behind the ABS and a substantial value for h2, higher OW and TPI are achieved while BPI is substantially maintained. Since leading shield volume is preserved proximate to the ABS because of the recessed notch, ATI is maintained and side shield saturation is avoided.

In a preferred embodiment, the first side of the notch in the patterned LS lower layer is recessed the third height (h3) of 20 to 500 nm from the ABS while the second cross-track width w1 of the notch is between 100 nm and 1 micron. The second height (h2) is from 50 nm to 1 micron.

A method for forming the patterned leading shield comprises a step of forming a notch in the lower leading shield (LS) layer by patternwise exposing and developing a first photoresist layer to form a first photoresist mask having a notch shape. The notch shape is transferred into the underlying lower LS layer by a conventional etch process in which exposed portions of the lower LS layer are removed thereby forming a backside at the second height (h2) from the ABS along with the first side of the notch at the third height (h3) from the ABS. After a first dielectric layer is formed behind the lower LS layer, the upper LS layer is deposited on the lower LS layer and on the first dielectric layer. Then a second photoresist mask is used to form an upper LS layer backside at height h1. Thereafter, a second dielectric layer is formed behind the upper LS layer backside, and a third photoresist mask is employed to generate a tapered top surface on the upper LS layer.

DETAILED DESCRIPTION

Figure 1:
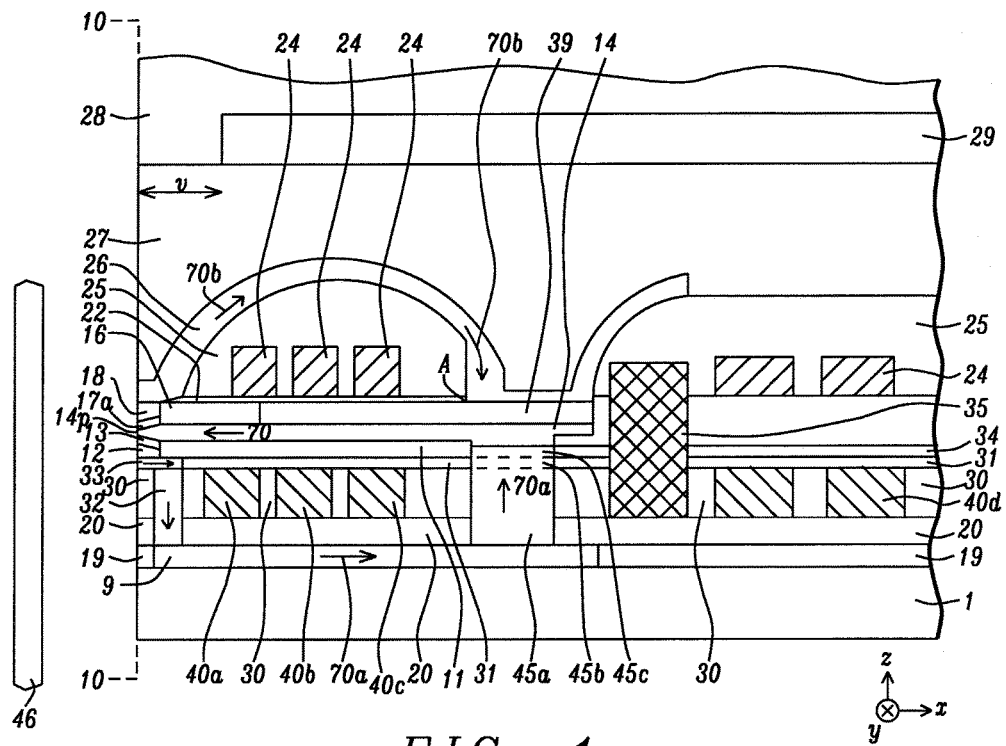
FIG. 1 is a down-track cross-sectional view showing a PMR writer having a double write shield (DWS) design with two flux return pathways to the main pole.

The present disclosure relates to a leading shield (LS) design where a top surface of a LS lower layer has a notch facing the main pole leading side to enable additional magnetic flux from the main pole leading side to improve OW and BER when writing a bit on a magnetic medium that is proximate to the ABS. The exemplary embodiments depict a main pole with a tapered leading side and tapered trailing side. However, the present disclosure also anticipates that one or both of the main pole leading side and trailing side proximate to the ABS are not tapered but are at a plane that is orthogonal to the ABS. In the drawings, the y-axis is a cross-track direction, the z-axis is a down-track direction, and the x-axis is in a direction orthogonal to the ABS and towards a back end of the PMR writer. Thickness refers to a down-track distance, width is a cross-track distance, and height is a distance from the ABS in a direction orthogonal to the ABS. It should be understood that the patterned LS design described herein is compatible with a variety of PMR writer structures and is not limited to the PMR writer depicted in FIG. 1. The term "below" refers to a down-track relationship of one structural element with respect to another structural element, and the term "behind" indicates a greater height for a second feature that is "behind" a first feature.

Referring to FIG. 1, a PMR writer currently fabricated by the inventors according to a process of record (POR) is depicted in a down-track cross-sectional view from a plane that is orthogonal to ABS 10-10 and passes through the main pole layer 14. The PMR writer is formed on a substrate 1 that may comprise a read head in a combined read/write head, for example. The substrate is typically part of a slider (not shown) formed in an array of sliders on a wafer. After the PMR writer is completed, the wafer is sliced to form rows of sliders. Each row is typically lapped to afford an ABS before dicing to fabricate individual sliders that are used in magnetic recording devices.

A return path (RTP) layer 9 may also serve as a S2B shield in the underlying read head in an embodiment where the PMR writer is part of a combined read/write head as appreciated by those skilled in the art. The RTP layer is recessed from the ABS 10-10 but is able to transmit flux from magnetic medium 46 to main pole 18 through the leading loop return pathway that may include a leading shield 12, leading shield connector (LSC) 33, S2C shield 32, the RTP, and a back gap connection (BGC) comprised of magnetic sections 45a-45c. In other embodiments, one or both of the LSC and S2C layers may be omitted such that the leading shield contacts the RTP layer.

The BGC may be depicted with three sections formed in a laminated manner and represented by stack 45a/45b/45c wherein a bottommost (lower) section 45a contacts a top surface of RTP 9, and an uppermost section 45c contacts a back portion of the bottom surface of main pole 14. In the exemplary embodiment, there is a first insulation layer 20 formed on the RTP and having an ABS facing side adjoining a bottom portion of the S2C 32 back side, and a back side abutting an ABS facing side of BGC lower section 45a. A second insulation layer 30 is formed on the first insulation layer and extends orthogonal to the ABS from an upper portion of the S2C back side to an ABS facing side of BGC section 45b. In some embodiments, a bucking coil layer with three turns 40a-40c is formed within the second insulation layer and between the S2C backside and BCG section 45b. However, the present disclosure also anticipates that a bucking coil layer with one turn, two turns, or four turns in a 1+1T, 2+2T, or 4+4T configuration may be employed as appreciated by those skilled in the art. Bucking coils are wound in series with an opposite polarity to that in the driving coils 24 to minimize direct coupling between the first trailing shield 18 and driving coils. A top surface of the bucking coil layer is preferably coplanar with a top surface of the second insulation layer, a top surface of BGC section 45a, and a top surface of S2C shield 32.

The second insulation layer 30 may also be formed between the ABS 10-10 and an upper portion of the ABS facing side of S2C shield 32. First insulation layer 20 may be formed between the ABS and a bottom portion of the ABS facing side of the S2C shield. RTP 9 is formed within insulation layer 19 and is recessed a certain distance from the ABS. Insulation layers 19, 20, 30 are comprised of a dielectric material and the bucking coil layer 40a-40c is typically a conductive material such as Cu. In the process of record (POR) practiced by the inventors, leading shield 12, LSC 33, S2C, back gap connection 45a-45c, and RTP 9 may be made of CoFeN, NiFe, CoFe, CoFeNi with a saturation magnetization (Ms) value of 10 kG to 16 kG.

A third insulation layer 31 contacts the top surface of the bucking coil turns 40a-40c and the second insulation layer 30 between a back side of LSC 33 and an ABS facing side of BGC section 45c. A fourth insulation layer 11 is formed on the third insulation layer and on a back end portion of the LSC. The fourth insulation layer extends from a backside of the leading shield 12 to an ABS facing side of uppermost BGC section 45c. According to one embodiment, first through second insulation layers have a combined thickness in a down-track direction substantially the same as BGC section 45a, while the third insulation layer has a thickness essentially the same as BGC section 45b. In some embodiments, a bottom yoke (not shown) is provided between a lead gap 13 and a back portion of the main pole that adjoins the top surface of BGC section 45c. In the exemplary embodiment, insulation layer 11 is also formed behind the lead gap and leading shield.

Above insulation layer 11 is the main pole 14 that may be comprised of CoFe, NiFe, CoFeNi or another magnetic material with a Ms of 19-24 kG. The main pole has a write pole tip 14p at the ABS 10-10, and extends toward the back end of the device where a back portion is magnetically connected with BGC section 45c. The leading shield is separated from the main pole by the lead gap 13. Flux from the main pole enters a magnetic medium 46 and returns in part as flux 70a though the leading loop comprised of LS 12, LSC 33, S2C 32, RTP 9, and BGC 45a-45c.

Returning to FIG. 1, the first trailing shield structure may include a lower magnetic (hot seed) layer with front portion 17a on write gap (not shown), and back portion 17b above a trailing side of the main pole 14. An upper layer in the first trailing shield structure is magnetic layer 18 that adjoins a bottom surface of an overlying second trailing shield also known as PP3 trailing shield 26. The trailing shield structure serves as a flux return pathway 70b wherein flux from a magnetic medium enters the first trailing shield and passes through the PP3 trailing shield to a back portion of main pole 14. The first trailing shield layer 18 and PP3 trailing shield are typically made of 10-19 kG materials.

There is a top yoke 39 contacting a portion the top surface of the main pole 14. The top yoke and bottom yoke (when present) transmit magnetic flux to the main pole where the flux 70 is concentrated at main pole tip 14p. The top yoke extends to a back side at point A where the top yoke touches the inner corner of PP3 26 above a back portion of the main pole. A bottom yoke may be included in the write head structure to provide a faster writer response compared with designs where only a top yoke is employed. An insulation layer 22 is formed on a portion of the non-magnetic layer 16 and top yoke behind trailing shield layer 18. A current is passed through driving coil layer 24 that is disposed on the insulation layer 22 to generate magnetic flux in the top yoke and main pole. The driving coil layer 24 may have one or a plurality of turns. Three turns are depicted above the main pole in this embodiment. Bucking coils are connected to driving coils through connector 35 that is a greater distance from the ABS than BGC 45.

In the exemplary embodiment, the PP3 trailing shield arches over driving coil layer 24 and connects with the top surface of the top yoke above the BGC 45c. The PP3 trailing shield may have a dome shape as in the exemplary embodiment or may have a planar top surface that is parallel to a top surface of the main pole. An insulation layer 25 is formed on the insulation layer 22 and fills the openings between the turns of driving coil layer 24 and the space between a top surface of the driving coils and a bottom surface of the PP3 shield layer 26. A protection layer 27 covers the PP3 trailing shield and is made of an insulating material such as alumina. Above the protection layer and recessed a certain distance from the ABS 10-10 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is formed as the uppermost layer in the write head.

There are two pathways for magnetic flux to return to the write head from magnetic medium 46. For example, magnetic flux 70 from main pole 14 exits through write pole tip 14p into a magnetic medium and may return via leading loop 70a as described previously. Flux from the magnetic medium also returns to the write head via pathway 70b by entering hot seed layer 17a at the ABS and then passing through write shield 18 and PP3 trailing shield 26 before reaching the main pole. The dual flux return pathway in the POR design is employed to reduce side track erasure (STE).

Figure 2A:
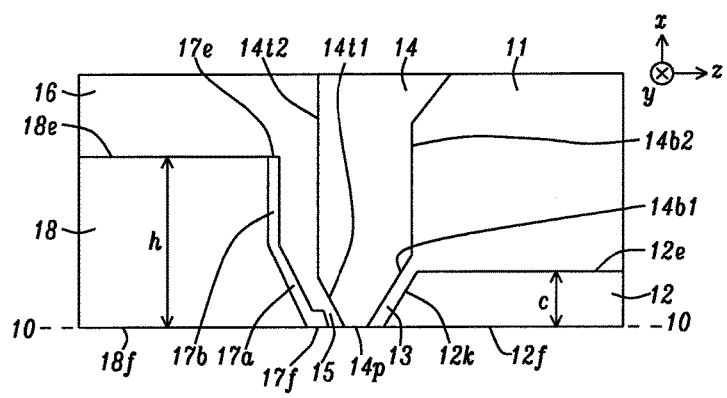
FIG. 2a is a down-track cross-sectional view of a main pole proximate to an ABS where a leading shield side adjoining a lead gap is formed substantially parallel to a tapered leading side of the main pole according to a prior art design.

Referring to FIG. 2a, a down-track cross-sectional perspective of the PMR writer in FIG. 1 is depicted with an enlarged view of a conventional leading shield 12 and trailing shield structure that is proximate to the main pole 14 at the ABS 10-10. The leading shield adjoins a bottom surface of lead gap 13 and has a planar side 12k that faces tapered leading side 14b1 of the main pole. Side 12k extends from the ABS to a height c at leading shield backside 12e, which is parallel to the front side 12f at the ABS. The hot seed layer has a first portion 17a facing main pole tapered trailing side 14t1 and with a front side 17f at the ABS, and a second portion 17b connected to a back end of the first portion and aligned parallel to main pole trailing side 14t2. Trailing shield 18 adjoins the hot seed layer portions 17a, 17b on sides thereof facing away from the write gap 15, and has a front side 18f at the ABS and a backside 18e at a second height h from the ABS where h>c.

Figure 2B:
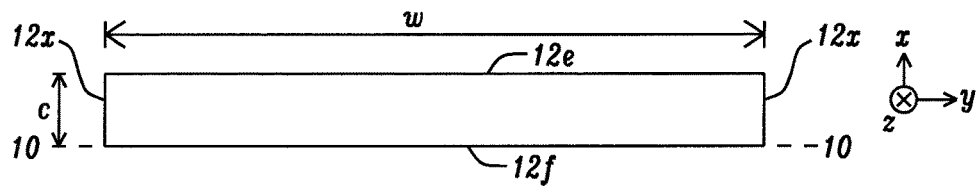
FIG. 2b shows a top-down view of the leading shield in FIG. 2a from a perspective at the main pole tapered leading side, and shows the leading shield backside is planar, and is parallel to the leading shield front side at the ABS.

In FIG. 2b, leading shield 12 in FIG. 2a is pictured from a top-down (down-track) perspective from main pole tapered leading side 14b1 and with lead gap 13 removed. The leading shield backside 12e has a cross-track width w between far sides 12x, and is planar with a surface that is uninterrupted by any openings.

In related U.S. Pat. No. 9,508,364, we disclosed how greater area density capability (ADC) and writer speed are realized in a PMR writer by modifying a conventional leading shield as well as the trailing shield, and side shields in a AWA shield configuration to include a 19 kG to 24 kG magnetic material with a damping parameter α of ≥0.04. Now we have discovered that further improvement in PMR writer performance is achieved through a LS design involving a patterned LS lower layer that faces the main pole and is aligned below the main pole leading side.

In related Ser. No. 15/595,357, we disclosed how a patterned leading shield comprises a notch at a side that adjoins the lead gap to provide better BPI, OW, and BER while substantially maintaining TPI and ATI. In some PMR writer designs, there is a need for greater TPI without a significant tradeoff in lower BPI. Here, we disclose a patterned LS structure that satisfies the aforementioned requirement.

Figure 3A:
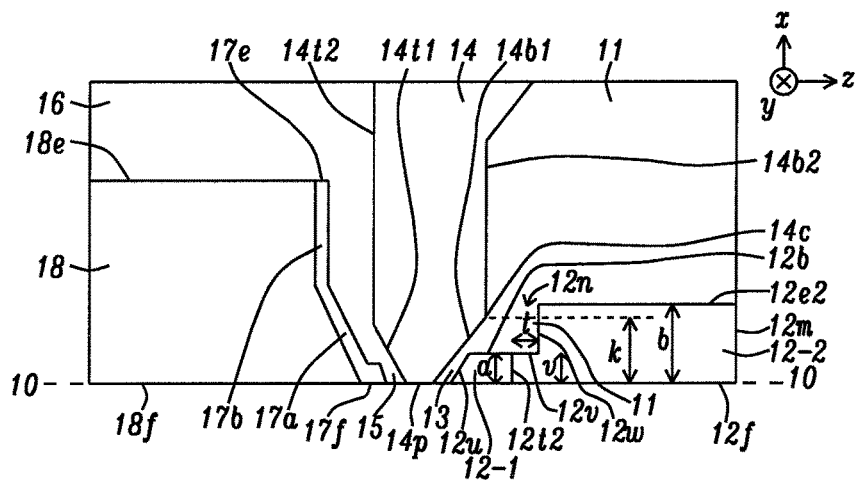
FIG. 3a is a down-track cross-sectional view of a PMR writer from a center plane wherein a patterned leading shield side facing the main pole has a notch with a first side aligned parallel to the ABS and a second side that is orthogonal to the ABS according to an embodiment of the present disclosure.

Referring to FIG. 3a, a PMR writer with a patterned leading shield (LS) is depicted according to one embodiment of the present disclosure. The patterned LS comprises a LS upper layer 12-1 and a LS lower layer 12-2 that adjoins the LS upper layer at top surface 12t2. The trailing shield structure comprised of hot seed layer portions 17a, 17b and magnetic layer 18 is retained from the POR structure illustrated in FIG. 2a. However, the present disclosure anticipates that other trailing shield structures used in the art may replace the POR scheme and yet enable all of the benefits of the patterned leading shield design in the exemplary embodiment. In a preferred embodiment, the main pole 14 has a tapered leading side 14b1 extending from the ABS 10-10 to a second leading side 14b2 that is aligned orthogonal to the ABS as described previously. The leading sides 14b1, 14b2 intersect at an end 14c of the tapered leading side that is at height k from the ABS. Moreover, the main pole retains a tapered trailing side 14t1 extending from the ABS to a second trailing side 14t2 aligned parallel to side 14b2 as previously indicated. Dielectric layer 11 contacts the backside 12e1 of patterned leading shield layer 12-2 while dielectric layer 16 adjoins the backsides 17e, 18e of hot seed layer portion 17b and trailing shield 18, respectively. Lead gap 13 has a front side at the ABS and adjoins an upper surface of LS upper layer 12-1.

A key feature of the patterned LS structure of the present disclosure is a patterned LS lower layer 12-2 with a notch 12n bounded by first side 12v that is aligned parallel to the ABS 10-10, and a second side 12w that is orthogonal to the ABS. FIG. 3a is taken at a center plane 42-42 that is orthogonal to the ABS, extends in a down-track direction, and bisects the LS structure shown in FIG. 3b. In a first embodiment, first side 12v in FIG. 3a is recessed height v from the ABS and is essentially coplanar with backside 12b of the LS upper layer at height a. The second side extends from an end of the first side to the LS lower layer backside 12e2, which is at height b where b>v. Note that b may also be greater than k wherein k is the height of corner 14c where the tapered main pole leading side 14b1 terminates. Front side 12f of the LS lower layer is at the ABS and ends at the bottom side 12m thereof. The LS upper layer 12-1 has a top surface hereafter referred to as side 12u that is aligned substantially parallel to main pole leading side 14b1 and is separated therefrom by lead gap 13. LS upper layer has a backside 12b at height a, a front side at the ABS, and a bottom surface at top surface 12t2 of the LS lower layer. Dielectric layer 41 fills the notch and adjoins the LS upper layer backside.

First side 12v has a down-track distance t of 20 to 200 nm from top surface 12t2 to second side 12w, and is recessed a distance of 20 to 500 nm (height v) from the ABS. Second side 12w has a length equal to (b–v). Note that as b increases, the leading shield volume away from the track center also increases and offers better protection against side shield saturation. However, OW and BPI decrease somewhat with higher b so that an upper limit for b is preferably 1 micron to enable a gain in TPI and ATI without a significant loss in BPI and OW.

Figure 3B:
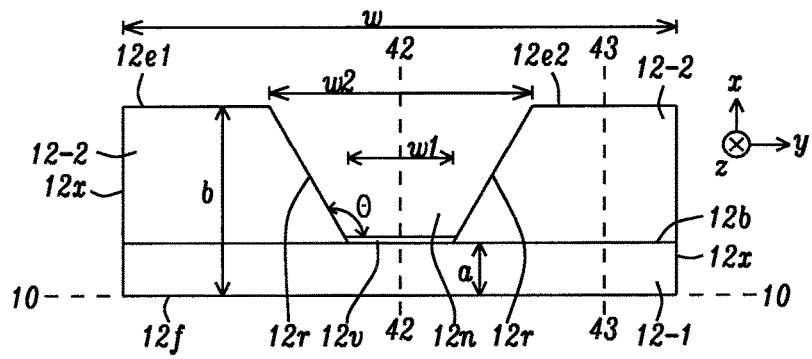
FIG. 3b is top-down view of the patterned leading shield from a perspective at the main pole tapered leading side, and shows the patterned side comprises a notch with a trapezoidal shape according to an embodiment of the present disclosure.

Referring to FIG. 3b, a top-down view of the patterned LS lower layer 12-2 in FIG. 3a from a perspective at the main pole tapered leading side 14b1 is shown with the lead gap removed. Preferably, backside 12b of LS upper layer 12-1 overlays on first side 12v of LS lower layer at height a. Notch 12n is an opening in the LS lower layer having a width w1 from 100 nm to 1 micron in a cross-track direction at the base that corresponds to side 12v in FIG. 3a. Each of two sidewalls 12r extends from an end of first side 12v to a LS lower layer backside section 12e1 or 12e2. Each backside section extends from an end of notch side 12r to a side 12x of the LS lower layer. In the exemplary embodiment, angle θ that is formed by the intersection of each sidewall 12r with first side 12v is from 90° to 170°. As a result, a cross-track width at the top of the notch between backside sections 12e1, 12e2 is greater than w1 when θ is >90°. The notch is bisected by center plane 42-42 that also bisects main pole leading side 14b1 and trailing side 14t1 in a down-track direction (FIG. 3d) such that each sidewall 12r is equidistant from the center plane.

Figure 3C:
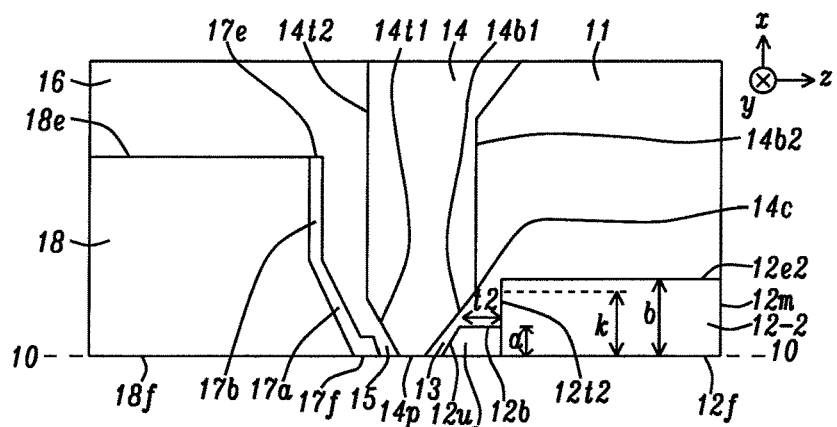
FIG. 3c is a down-track cross-sectional view of the PMR writer structure in FIG. 3a from a plane aligned parallel to the center plane, and that does not intersect the notch in the patterned leading shield (LS).

In FIG. 3c, a down-track cross-sectional view is shown at plane 43-43 that is parallel to the center plane in FIG. 3b, and intersects backside section 12e2. Backside 12b of the LS upper layer 12-1 has a down-track thickness t2 that may be greater or less than t. As mentioned earlier, although b>k in the exemplary embodiment, b may be less than or equal to k in other embodiments.

Figure 3D:
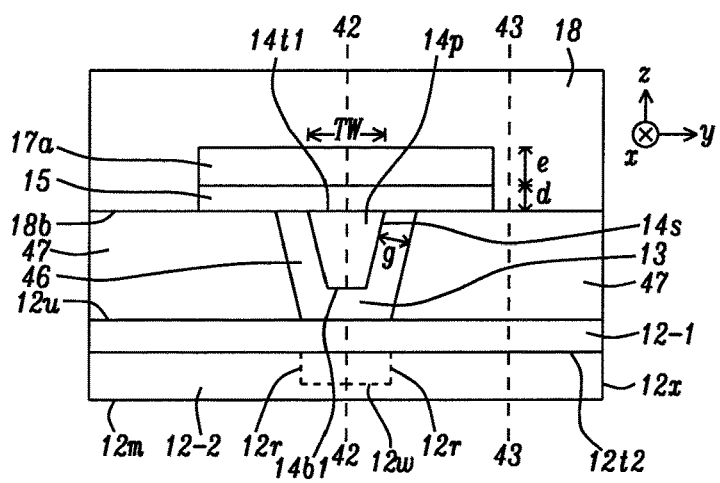
FIG. 3d is an ABS view of an all wrap around (AWA) shield structure with a patterned leading shield according to an embodiment of the present disclosure.

Referring to FIG. 3d, an ABS view of an all wrap around (AWA) shield embodiment is shown where the shield structure comprising side shields 47, trailing shield 18, and patterned leading shield with LS upper layer 12-1 and LS lower layer 12-2 completely surrounds the main pole tip 14p. The LS upper layer top surface 12u contacts a bottom surface of lead gap as well as bottom surfaces of side shields 47. Each side shield adjoins a side of the side gap 46 that is a side gap distance g from each main pole side 14s. Each side shield adjoins a bottom surface 18b of the trailing shield. Write gap 15 has a thickness d, and a greater cross-track width than track width TW at the trailing side of the main pole. The write gap contacts a top surface (trailing side) 14t1 of the write pole tip in addition to top surfaces of side gaps 46 and side shields 47. Trailing shield hot seed layer 17a may have a cross-track width that is essentially equivalent to that of the write gap, and has a thickness e. Side shields and trailing shield 18 may be comprised of a 10-19 kG magnetic material such as CoFe, CoFeNi, FeNi, and CoFeN. LS lower layer side 12w and sidewalls 12r are recessed behind the ABS in this view. Lead gap 13 has a front side at the ABS that contacts main pole leading side 14b1. Preferably, side 12w is aligned below the main pole tapered side 14b1 in a down-track direction. In the exemplary embodiment, the notch has a cross-track width between sides 12r that is substantially the same as TW. However, in other embodiments, the notch cross-track width (w1 in FIG. 3b) may have a value that is between 1× and 11× that of track width TW.

In one embodiment, LS layers 12-1, 12-2 are made of a 10-19 kG material that is CoFe, CoFeNi, FeNi, or CoFeN. In other embodiments, one or both of the LS layers may comprise a high damping material with a damping parameter α≥0.04 that is an alloy such as FeNiM, FeCoM, or FeCoNiM where M is one of Re, Os, Ir, Rh, Ti, Ta, V, Cr, W, Mn, Mo, Cu, Zr, Nb, Hf, Ru, Pd, Pt, Ag, and Au as disclosed in related U.S. Pat. No. 9,508,364.

Figure 4A:
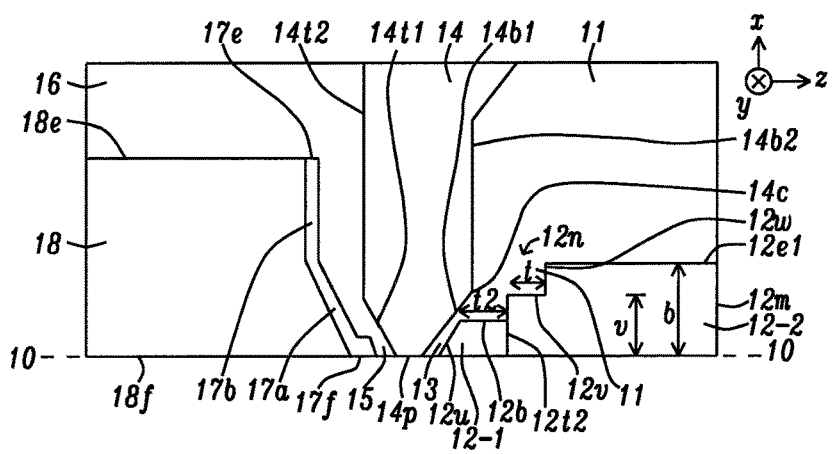
FIG. 4a and FIG. 4b are down-track cross-sectional views wherein the patterned LS structure in FIG. 3a is modified such that the recessed height of the notch front side in the lower LS layer is greater and less, respectively, than the height of the LS upper layer backside according to embodiments described herein.

According to a second embodiment of the present disclosure depicted in FIG. 4a, the recessed height v of the first notch side 12v in LS lower layer 12-2 is greater than height a of the LS upper layer backside 12b. Accordingly, at the center plane, LS lower layer top surface 12t2 extends behind the upper layer backside with respect to the ABS 10-10. In other words, both of the recessed height and down-track depth (thickness) t of the notch 12n may be adjusted to tune the effect of the patterned leading shield on PMR writer magnetic performance including BPI, TPI, overwrite, and BER.

Figure 4B:
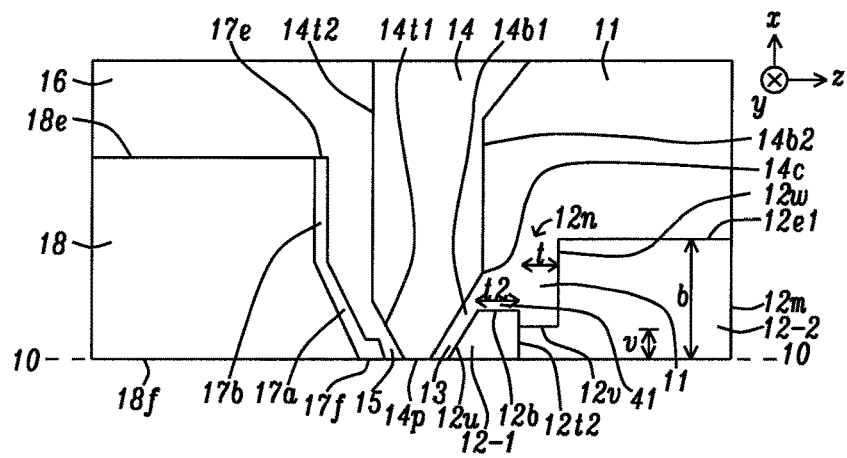

In a third embodiment of the present disclosure shown in FIG. 4b, the recessed height v of first notch side 12v is less than height a of LS upper layer backside 12b at the center plane that bisects the leading shield layers 12-1 and 12-2, and main pole 14. Dielectric layer 41 fills the notch 12n and adjoins the LS upper layer backside. Note that the down-track cross-sectional view of the second and third embodiments at plane 43-43 that does not intersect the notch is the same as illustrated in FIG. 3c.

The present disclosure also encompasses a method of fabricating the leading shield design disclosed herein. FIGS. 5a-11 relate to a sequence of steps that may be employed to make a LS upper layer 12-1 on a patterned LS lower layer 12-2 described in the embodiment relating to FIGS. 3a-3d.

Figure 5A:
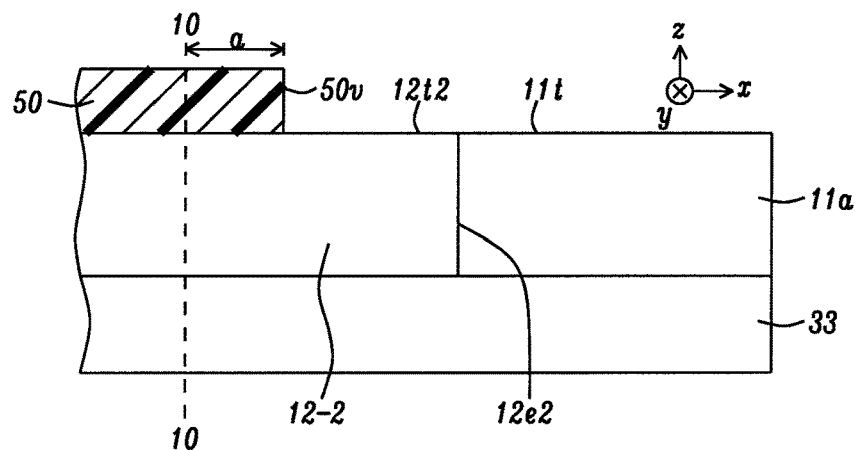
FIG. 5a is a down-track cross-sectional view showing a step of patterning a leading shield lower layer according to an embodiment of the present disclosure.

Referring to FIG. 5a, a first step in forming a patterned LS lower layer 12-2 is depicted at center plane 42-42 described previously. LS lower layer 12-2 is formed in dielectric layer 11a by a conventional method on a substrate that may be leading shield connector (LSC) 33 in FIG. 1. Thus, LS lower layer backside 12e2 adjoins an ABS facing side of the dielectric layer. In other PMR writer embodiments, the substrate may be a different metal or alloy layer, or another dielectric layer as appreciated by those skilled in the art. A first photoresist layer is coated on the LS lower layer and dielectric layer, and is then patternwise exposed and developed to yield a first photoresist mask layer 50 with backside 50v that exposes portions of LS lower layer top surface 12t2 and all of the dielectric layer top surface 11t. Plane 10-10 indicates the eventual location of the ABS after a lapping process is performed in a later step. Backside 50v is formed at height a from plane 10-10.

Figure 5B:
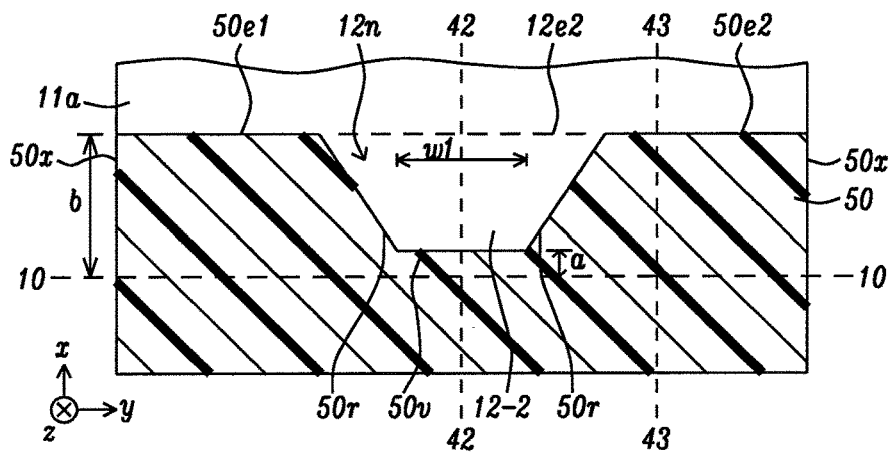
FIG. 5b is top-down view of the partially formed patterned leading shield (LS) structure in FIG. 5a after the photoresist mask pattern comprising a notch is transferred into the leading shield lower layer.
Figure 6A:
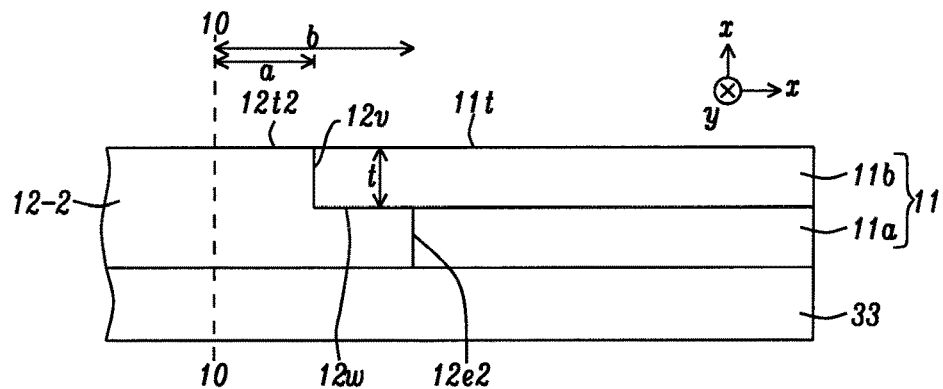
FIGS. 6a-6b are down-track cross-sectional views of the partially formed patterned LS structure in FIG. 5b after a planarization step that are taken from a center plane, and a plane aligned parallel to the center plane that does not intersect the notch according to an embodiment of the present disclosure.

In FIG. 5b, a top-down view of the partially formed LS structure in FIG. 5a is depicted after a conventional ion beam etch (IBE) or reactive ion etch (RIE) is used to remove an upper region of exposed portions of LS lower layer 12-2 and dielectric layer 11a. The IBE or RIE stops at a depth t from top surface 12t2 (FIG. 6a). Notch (opening) 12n is formed between first photoresist mask layer sides 50r and side 50v that are aligned above LS lower layer sides 12r and 12v, respectively. Sides 50x overlay on sides 12x of the leading shield structure while first photoresist mask layer backside sections 50e1 and 50e2 at height b from plane 10-10 are overlaid on LS lower layer backside sections 12e1 and 12e2, respectively.

The present disclosure anticipates that due to limitations in the photoresist patternwise exposure, especially for w1 dimensions substantially less than 100 nm, the notch shape proximate to where each side 50r intersects side 50v may have curvature rather than be comprised of straight lines. Furthermore, the intersections of sides 50r with sides 50e1 and 50e2 may have curvature (not shown).

Referring to FIG. 6a, the partially formed LS structure in FIG. 5b is depicted at the center plane after the first photoresist mask layer is removed by a well known method, and dielectric layer 11b is deposited on LS upper layer 12-2 and dielectric layer 11a thereby filling the notch having a down-track thickness t of 20 to 200 nm in LS lower layer 12-2. Thereafter, a chemical mechanical polish (CMP) process is typically employed to form a LS lower layer top surface 12t2 that is coplanar with dielectric layer top surface 11t. Layers 11a, 11b may be made of the same dielectric material and are considered to be a single dielectric layer 11.

Figure 6B:
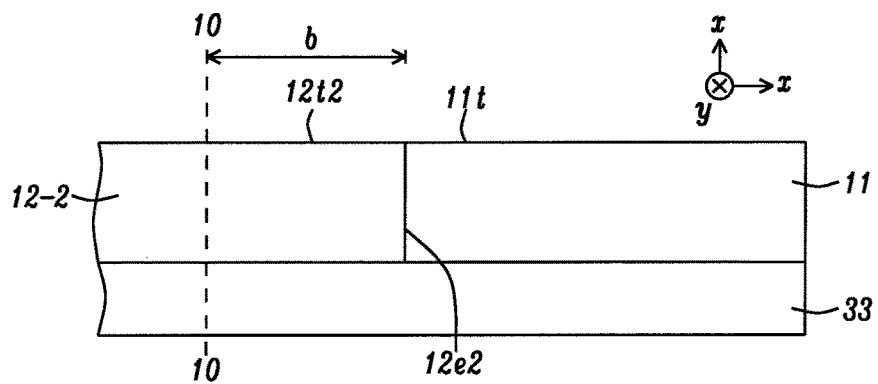

FIG. 6b illustrates the partially formed LS structure in FIG. 6a from a perspective at plane 43-43 described previously. LS lower layer backside section 12e2 extends from substrate 33 to top surface 12t2 at height b.

Figure 7:
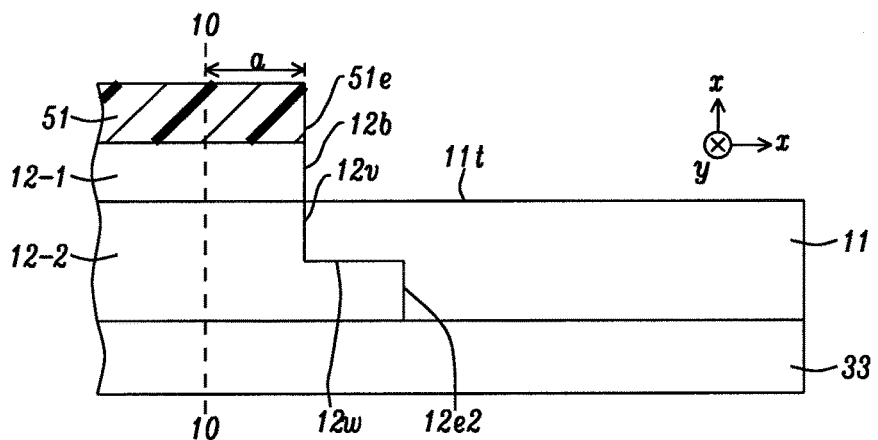
FIG. 7 is a down-track cross-sectional view depicting a step of patterning a LS upper layer according to an embodiment of the present disclosure.

Referring to FIG. 7, a down-track cross-sectional view at the center plane 42-42 is shown after the LS upper layer 12-1 is deposited on LS lower layer 12-2 and dielectric layer 11. Next, a second photoresist layer is coated, and patternwise exposed and developed to yield a second photoresist mask layer 51 with a backside 51e that is at height a (and v) and is preferably aligned over the first notch side 12v in the LS lower layer. In other embodiments (not shown), height v for backside 51e may be less than or greater than a. A second IBE or RIE is performed to remove exposed portions of the LS upper layer. As a result, LS upper layer backside 12b is aligned over first notch side 12v, and top surface 11t of dielectric layer 11 is uncovered.

Figure 8A:
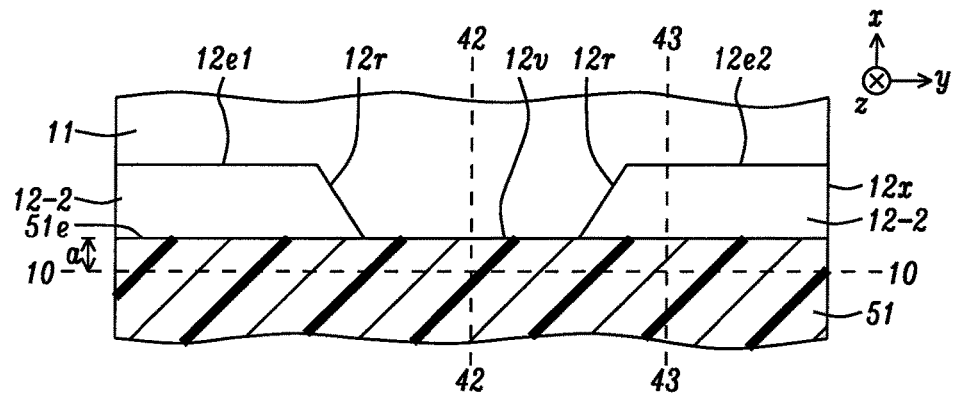
FIG. 8a is a top-down view of the photoresist pattern in FIG. 7 after an etch process removes exposed portions of the LS upper layer to form a sharp cornered notch.

In FIG. 8a, a top-down view of the partially formed LS structure in FIG. 7 is shown. Second photoresist masking layer backside 51e has height a between LS lower layer sides 12x and overlays on first side 12v. LS lower layer sides 12r and backside sections 12e1, 12e2 are now exposed after the second RIE or IBE process.

Figure 8B:
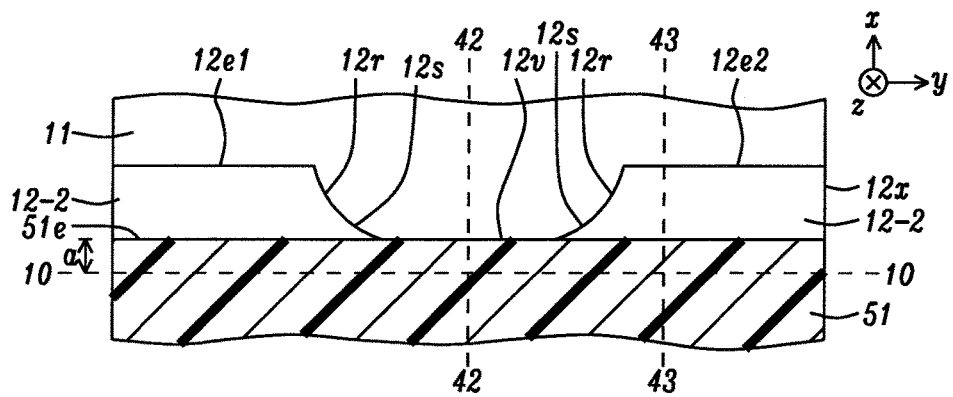
FIG. 8b is a similar view after an etch process forms a rounded corner in the notch.

Referring to FIG. 8b, the present disclosure also anticipates an embodiment wherein a certain amount of curvature occurs in the first photoresist mask layer proximate to the intersection of side 50r with side 50v as explained previously. The curved corner shape may be etch transferred into the underlying LS lower layer 12-2 so that the notch portion proximate to the intersection of sides 12v and 12r also forms a substantially curved shape corresponding to corners 12s.

Figure 9A:
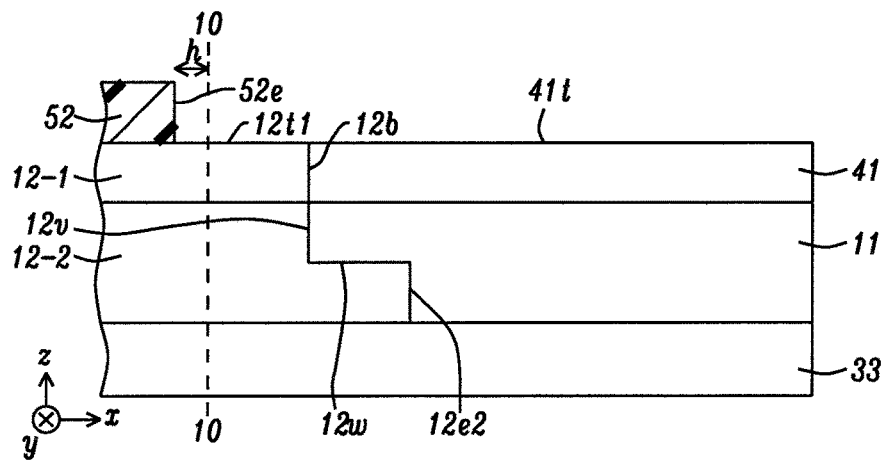
FIGS. 9a-9b are down-track cross-sectional views of the partially formed patterned LS structure in FIG. 8a after a second planarization step and third photoresist patterning step that are taken from a center plane, and a plane aligned parallel to the center plane that does not intersect the patterned LS notch.

Referring to FIG. 9a, the partially formed LS structure is shown from a down-track cross-sectional view at the center plane after the second photoresist mask layer is removed, and a second dielectric layer 41 is deposited on exposed portions of the LS lower layer 12-2 and on the first dielectric layer 11. A second CMP process is employed to form a LS upper layer top surface 12t1 that is coplanar with the second dielectric layer top surface 41t. Thereafter, a third photoresist layer is coated, and then patternwise exposed and developed to yield a third photoresist mask layer 52 with a backside 52e that is on a opposite side of plane 10-10 with respect to LS upper layer backside 12b. Accordingly, LS upper layer top surface 12t1 and second dielectric layer top surface 41t are completely exposed on an opposite side of plane 10-10 with respect to backside 52e.

Figure 9B:
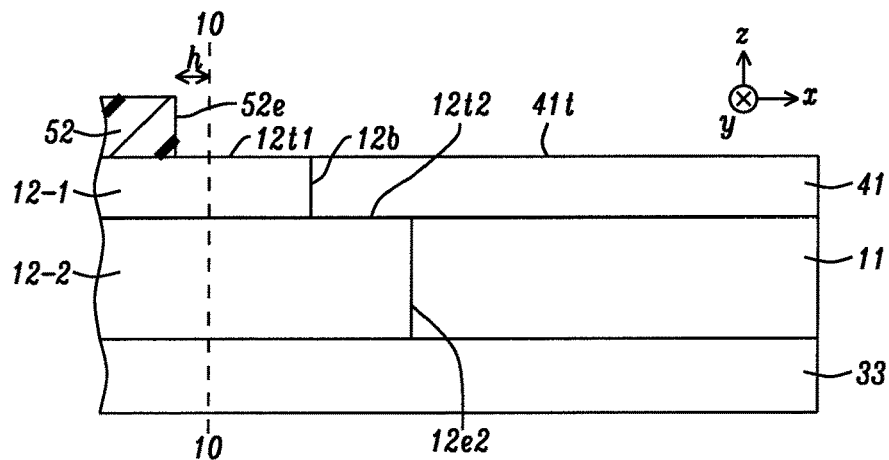

FIG. 9b illustrates a down-track cross-sectional view of the LS structure in FIG. 9a from a perspective at plane 43-43. Preferably, backside 52e is separated from plane 10-10 by distance (height) h across the entire cross-track distance between sides 12x of LS upper layer 12-1.

Figure 10:
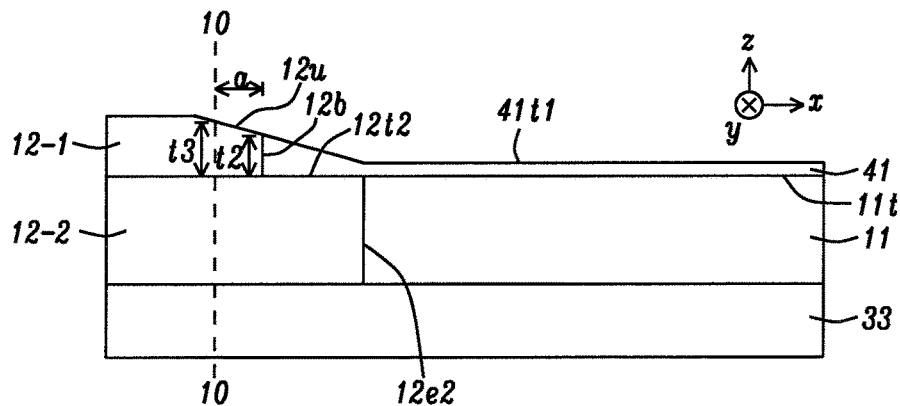
FIG. 10 is a down-track cross-sectional view of the partially formed PMR writer in FIG. 9b after a tapered top surface is formed on the LS upper layer according to an embodiment of the present disclosure.

Referring to FIG. 10, a down-track cross-sectional view of the partially formed LS structure is shown at the center plane after a third IBE or RIE step where ions (not shown) are directed toward the third photoresist mask layer at an angle that is greater than 0 degrees and less than 90 degrees with respect to the z-axis. As a result, a tapered top surface 12u is formed on LS upper layer 12-1 and has a down-track thickness t2 at backside 12b that is less than a down-track thickness t3 of the LS upper layer at plane 10-10. Moreover, the etch stops within second dielectric layer 41 thereby forming a new top surface 41t1 so that top surface 11t of the first dielectric layer, and top surface 12t2 of the LS lower layer are not exposed.

Figure 11:
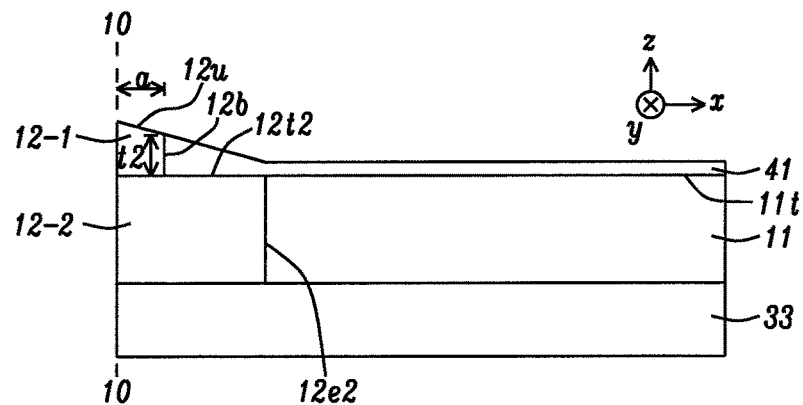
FIG. 11 is a down-track cross-sectional view of the partially formed PMR writer in FIG. 10 after a lapping process is performed to determine an ABS according to an embodiment of the present disclosure.

FIG. 11 depicts the leading shield portion of the PMR writer after all layers in the PMR writer structure are formed, and a lapping process is used to generate an ABS at plane 10-10. The main pole and overlying layers are not depicted in order to focus on the key aspects of the LS structure. However, it should be understood that the lead gap 13 is deposited on top surface 12u and on dielectric layer 41 before the main pole is deposited to form tapered leading side 14b1 and leading side 14b2 in FIG. 3a.

In order to demonstrate the advantages of the patterned leading shield design of the present disclosure, a simulation was performed to compare a POR leading shield reference with that of an embodiment described herein. In both of the reference (POR leading shield) and the patterned leading shield, there is a cross-track width w of 14 microns between sides 12x of the LS upper and lower layers; a main pole track width (TW) of 45 nm, and each LS layer is made of a 12 kG material. The POR leading shield has height c (FIG. 2a) of 150 nm. According to a patterned LS embodiment described with respect to FIGS. 3a-3d, the LS lower layer has a notch with sidewalls where $\theta=135°$, and a first (front) side having a cross-track width w1 of 200 nm and that is recessed 150 nm from the ABS (height a). The notch also has a height b of 600 nm, and a down-track depth t of 900 nm.

Figure 12A:
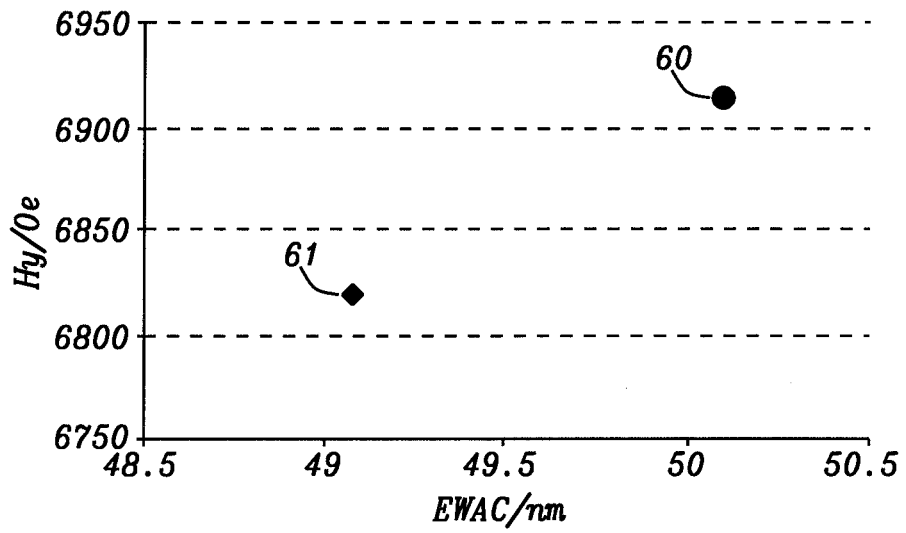
FIG. 12a is a graph showing the results of Hy field vs. erase width in an AC field mode (EWAC) for a PMR writer having a conventional leading shield, and with a patterned leading shield according to an embodiment of the present disclosure.
Figure 12B:
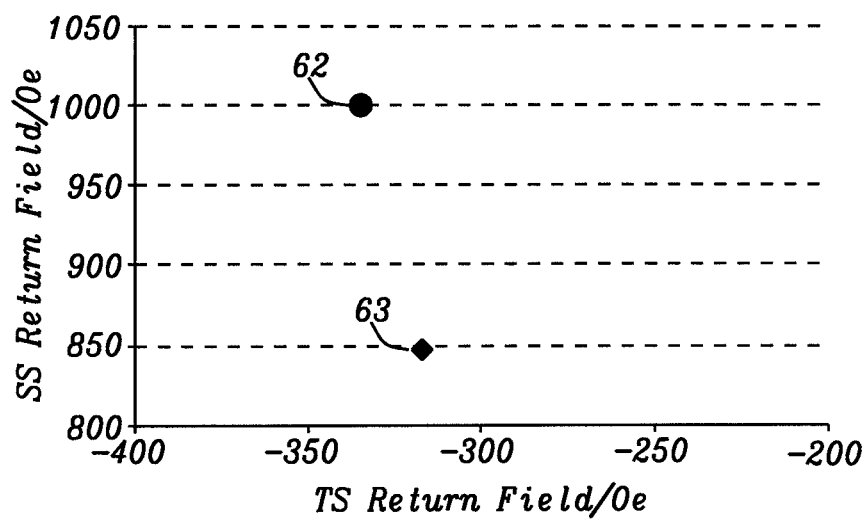
FIG. 12b is a graph showing the results of side shield return field vs. trailing shield return field for a PMR writer having a conventional leading shield, and with a patterned leading shield according to an embodiment of the present disclosure.

Referring to FIG. 12a, Hy field on the recording media is plotted vs. erase width in AC mode (EWAC) for a PMR writer with the leading shield reference (point 60), and for the patterned leading shield (point 61) depicted in FIGS. 3a-3d. Finite-element-method (FEM) simulation results indicate the patterned leading shield enables a PMR writer to have a smaller erasure width that is achieved with an insignificant reduction in field strength. Furthermore, in FIG. 12b where side shield (SS) return field is plotted vs. trailing shield (TS) return field for the POR reference (point 62) and for the patterned leading shield (point 63) described previously, a PMR writer with patterned leading shield described herein shows a substantially more negative SS return field while substantially maintaining the TS return field. Overall, the simulation results indicate a PMR writer with a patterned leading shield of the present disclosure will provide better squeeze writing performance with higher TPI while substantially maintaining BPI for a net ADC gain. The patterned leading shield structure may be easily combined with other design features aimed at improving OW and TS response thereby helping the PMR writer achieve better balance between TS performance and SS performance.

Figure 13A:
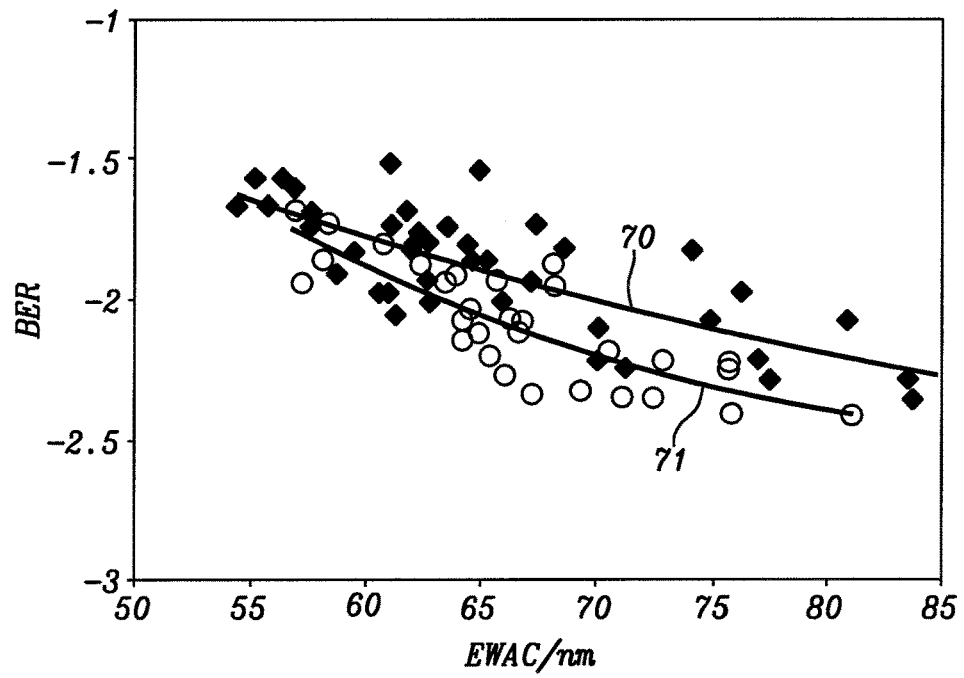
FIG. 13a is a graph showing BER vs. EWAC for a conventional leading shield, and for a PMR writer with a patterned leading shield according to an embodiment of the present disclosure.
Figure 13B:
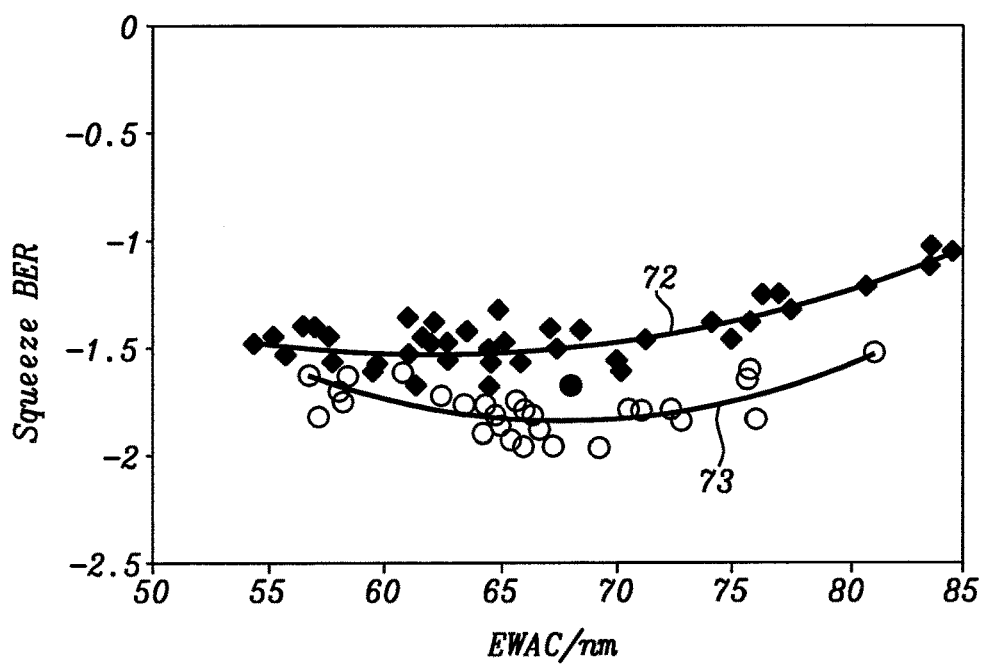
FIG. 13b is a graph showing squeeze BER vs. EWAC for a PMR writer with a conventional leading shield, and with a patterned leading shield according to an embodiment of the present disclosure.

FIG. 13a depicts spinstand data where BER is plotted vs. EWAC for a PMR writer having a POR leading shield design (curve 70), and for a PMR writer with a patterned leading shield described herein (curve 71). The patterned leading shield design affords BER gain of about 0.2 orders of magnitude. Meanwhile, squeeze BER is plotted vs. EWAC in FIG. 13b for the PMR writer with a POR leading shield (curve 72) and for a PMR writer with a patterned leading shield (curve 73) disclosed herein. There is a squeeze BER gain of 0.3 to 0.4 orders of magnitude observed for a PMR writer having the patterned leading shield formed according to an embodiment of the present disclosure. In summary, a better tradeoff between TPI and BPI is realized than in the prior art because TPI may be optimized while substantially maintaining BPI.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a first leading side and a trailing side, and two sides that connect the first leading side with the trailing side, the first leading side adjoins a lead gap having a front side at an air bearing surface (ABS), and the trailing side has a track width at the ABS;
   (b) the lead gap that separates the first leading side and a leading shield; and
   (c) the leading shield with an upper layer having a first cross-track width, a front side at the ABS, a backside at a first height (a) from the ABS, an upper surface adjoining the lead gap, and a lower surface adjoining a top surface of a lower layer wherein the lower layer comprises:
      (1) a front side having the first cross-track width at the ABS;
      (2) a backside at a second height (b) from the ABS where b>a; and
      (3) the top surface that is orthogonal to the ABS, and wherein the lower layer has a notch with a first side that is parallel to the ABS, one end at the top surface, and is recessed a third height (v) from the ABS, and a second side that extends from a second end of the first side to the lower layer backside, the first side has a second cross-track width between two notch sidewalls that are equidistant from a center plane that bisects the leading shield and the main pole.

2. The PMR writer of claim 1 wherein the first leading side is tapered and the upper surface of the leading shield upper layer is formed substantially parallel to the tapered first leading side.

3. The PMR writer of claim 1 wherein the leading shield upper and lower layers are made of CoFe, CoFeNi, FeNi, or CoFeN that is a 10-19 kG material.

4. The PMR writer of claim 1 wherein the second cross-track width is about 100 nm to 1 micron.

5. The PMR writer of claim 1 wherein the first side has a down-track length of about 20 nm to 200 nm.

6. The PMR writer of claim 1 wherein the third height is about 20 nm to 500 nm.

7. The PMR writer of claim 1 wherein the second height is about 50 nm to 1 micron.

8. The PMR writer of claim 1 wherein each of the two notch sidewalls intersect the first side at an angle of 90 to 170 degrees.

9. The PMR writer of claim 8 wherein the notch has a substantially curved shape proximate to the intersection of each of the two notch sidewalls with the first side.

10. The PMR writer of claim 1 wherein one or both of the leading shield upper and lower layers have a damping parameter $\alpha \geq 0.04$ and are comprised of an alloy that is one of FeNiM, FeCoM, and FeCoNiM wherein M is one of Re, Os, Ir, Rh, Ti, Ta, V, Cr, W, Mn, Mo, Cu, Zr, Nb, Hf, Ru, Pd, Pt, Ag, and Au.

11. The PMR writer of claim 1 wherein v>a.

12. The PMR writer of claim 1 wherein v<a.

13. A perpendicular magnetic recording (PMR) writer, comprising:
   (a) a main pole with a leading side and a trailing side, the leading side adjoins a lead gap at an air bearing surface (ABS) and the trailing side adjoins a write gap at the ABS;
   (b) a gap layer surrounding the main pole, the gap layer includes the lead gap, the write gap, and a side gap which contacts a side of the main pole formed between the trailing side and leading side on each side of a center plane that bisects the main pole in a direction orthogonal to the ABS; and
   (c) an all wrap around (AWA) shield structure, comprising:
      (1) a trailing shield formed on the write gap and contacting a side shield on each side of the center plane;
      (2) each of the side shields that adjoins one of the side gaps; and
      (3) a leading shield with an upper layer having a first cross-track width, a front side at the ABS, a backside at a first height (a) from the ABS, an upper surface adjoining the lead gap and a bottom surface of each side shield, and a lower surface adjoining a top surface of a lower layer wherein the lower layer comprises:
      a front side having the first cross-track width at the ABS;
      a backside at a second height (b) from the ABS where b>a; and
      the top surface that is orthogonal to the ABS, and wherein the lower layer has a notch with a first side that is parallel to the ABS, has a first end at the top surface, and is recessed a third height (v) from the ABS, and a second side that extends from a second end of the first side to the lower layer backside, the first side has a second cross-track width between two notch sidewalls that are equidistant from the center plane.

14. The PMR writer of claim 13 wherein the first leading side is tapered and the upper surface of the leading shield upper layer is formed substantially parallel to the tapered first leading side.

15. The PMR writer of claim 13 wherein the leading shield upper and lower layers are made of CoFe, CoFeNi, FeNi, or CoFeN that is a 10-19 kG material.

16. The PMR writer of claim 13 wherein the second cross-track width is about 100 nm to 1 micron.

17. The PMR writer of claim 13 wherein the first side has a down-track length of about 20 nm to 200 nm.

18. The PMR writer of claim 13 wherein the first height is about 20 nm to 500 nm.

19. The PMR writer of claim 13 wherein the second height is about 50 nm to 1 micron.

20. The PMR writer of claim 13 wherein each of the two notch sidewalls intersect the first side at an angle from 90 to 170 degrees.

21. The PMR writer of claim 20 wherein the notch has a substantially curved shape proximate to the intersection of each of the two notch sidewalls with the first side.

22. The PMR writer of claim 13 wherein one or both of the leading shield upper and lower layers have a damping parameter α≥0.04 and are comprised of an alloy that is one of FeNiM, FeCoM, and FeCoNiM wherein M is one of Re, Os, Ir, Rh, Ti, Ta, V, Cr, W, Mn, Mo, Cu, Zr, Nb, Hf, Ru, Pd, Pt, Ag, and Au.

23. The PMR writer of claim 13 wherein v>a.

24. The PMR writer of claim 13 wherein v<a.

25. A method of forming a patterned leading shield structure in a perpendicular magnetic recording (PMR) writer, comprising:
(a) forming a first leading shield (LS) layer with a top surface, a first cross-track width at a first plane that is orthogonal to the first LS layer top surface, and a second height (b) between the first plane and a backside that is aligned parallel to the first plane, and wherein the first LS layer top surface has a notch formed therein, the notch comprises a first side that is recessed a third height (v) from the first plane where b>v, is formed parallel to the first plane and extends a first down-track distance from the top surface to a second notch side that is orthogonal to the first plane, and extends from an end of the first notch side to the first LS layer backside that adjoins a first dielectric layer;
(b) forming a second leading shield (LS) layer on the first LS layer top surface, the second LS layer has the first cross-track width at the first plane, and a backside that is at a first height (a) from the first plane where a<b;
(c) forming a second dielectric layer on the top surfaces of the first LS layer and first dielectric layer wherein the second dielectric layer has a top surface that is coplanar with a top surface of the second LS layer and has a front side that adjoins the second LS layer backside;
(d) performing an angled ion beam etch that forms a tapered top surface on the second LS layer such that a thickness of the second LS layer at the first height is less than a thickness of the second LS layer at the first plane; and
(e) performing a lapping process that forms an air bearing surface (ABS) at the first plane, and a front side on each of the first and second LS layers at the ABS.

26. The method of claim 25 wherein the first and second leading shield layers are made of CoFe, CoFeNi, FeNi, or CoFeN that is a 10-19 kG material.

27. The method of claim 25 wherein the first cross-track width is about 100 nm to 1 micron.

28. The method of claim 25 wherein the first down-track distance is about 20 nm to 200 nm.

29. The method of claim 25 wherein v is about 20 to 500 nm.

30. The method of claim 25 wherein b is about 50 nm to 1 micron.

31. The method of claim 25 further comprised of forming a lead gap on the second LS layer tapered top surface, and a main pole layer with a tapered leading side on the lead gap before performing the lapping process.

32. The method of claim 25 wherein the notch further comprises two sidewalls that are formed equidistant from a center plane that bisects the first and second LS layers, and wherein each of the two sidewalls intersects the first notch side at an angle from about 90 to 170 degrees.

33. The method of claim 25 wherein the first and second leading shield layers have a damping parameter α≥0.04 and are comprised of an alloy that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au.

34. The method of claim 25 wherein v>a.

35. The method of claim 25 wherein v<a.

* * * * *